(12) United States Patent
Igarashi (10) Patent No.: US 9,977,436 B2
(45) Date of Patent: May 22, 2018

(54) FLOW RATE ADJUSTMENT APPARATUS

(71) Applicant: SURPASS INDUSTRY CO., LTD, Saitama (JP)

(72) Inventor: Hiroki Igarashi, Saitama (JP)

(73) Assignee: Surpass Industry Co., Ltd., Saitama (JP)

( * ) Notice: Subject to any disclaimer, the term of this patent is extended or adjusted under 35 U.S.C. 154(b) by 0 days. days.

(21) Appl. No.: 15/275,825

(22) Filed: Sep. 26, 2016

(65) Prior Publication Data

US 2017/0097646 A1    Apr. 6, 2017

(30) Foreign Application Priority Data

Oct. 2, 2015    (JP) .................................. 2015-196749

(51) Int. Cl.
| | |
|---|---|
| *F16K 31/02* | (2006.01) |
| *G05D 7/06* | (2006.01) |
| *F16K 31/04* | (2006.01) |
| *F16K 31/00* | (2006.01) |
| *F16K 27/02* | (2006.01) |

(52) U.S. Cl.
CPC ......... *G05D 7/0635* (2013.01); *F16K 27/029* (2013.01); *F16K 31/002* (2013.01); *F16K 31/046* (2013.01)

(58) Field of Classification Search
CPC .... F16K 27/029; F16K 31/046; F16K 31/002; G05D 7/0635; Y10T 137/7759; Y10T 137/7761; Y10T 137/5109
USPC .............................. 137/486, 487.5, 338, 269
See application file for complete search history.

(56) References Cited

U.S. PATENT DOCUMENTS 5,303,731 A  *  4/1994  Vavra ........................ G01F 1/50
                                                            137/468
6,539,968 B1    4/2003  White et al.
6,578,435 B2 *  6/2003  Gould ....................... G01F 1/36
                                                              137/2

(Continued)

FOREIGN PATENT DOCUMENTS

JP    2001-125649 A    5/2001
JP    2001-242940 A    9/2001

OTHER PUBLICATIONS

Extended European Search Report in EP Application No. 16190630.0 dated Feb. 23, 2017, 7 pages.

*Primary Examiner* — Minh Le
(74) *Attorney, Agent, or Firm* — MH2 Technology Law Group, LLP (57) ABSTRACT

There is provided a flow rate adjustment apparatus in which a flow rate measurement mechanism includes: a thermal flowmeter; and a lower casing, a flow rate adjustment mechanism includes: an electric drive mechanism that moves a valve body part; a control board; a valve main body in which a valve chamber, a second flow passage that communicates with a valve hole, and a third flow passage that is connected to an external flow passage have been formed; and an upper casing that houses the electric drive mechanism and the control board thereinside, the flow rate adjustment mechanism is attached to the flow rate measurement mechanism in a state where a clearance communicating with an outside is provided between the lower casing and the valve main body, and in which the thermal flowmeter has a coupling part that couples the second flow passage to a first flow passage.

5 Claims, 6 Drawing Sheets

(56) References Cited

U.S. PATENT DOCUMENTS

| | | | | |
|---|---|---|---|---|
| 6,889,706 B2* | 5/2005 | Fukano | .................. | G05D 7/005 137/487.5 |
| 7,296,465 B2* | 11/2007 | Ding | .................... | G01F 1/6847 73/202.5 |
| 7,748,684 B2* | 7/2010 | Ito | ...................... | F16K 31/0658 251/129.15 |
| 7,866,337 B2* | 1/2011 | Chinnock | ................ | G01F 1/363 137/486 |
| 8,205,635 B2* | 6/2012 | Igarashi | .................... | G01F 1/42 137/486 |
| 8,225,814 B2* | 7/2012 | Igarashi | .............. | F16K 37/0066 137/338 |
| 8,511,337 B2* | 8/2013 | Nishimura | ................ | F16K 1/42 137/487.5 |
| 8,573,247 B2* | 11/2013 | Ushigusa | .................. | G01F 1/36 137/486 |
| 8,590,561 B2* | 11/2013 | Igarashi | .................... | G01F 1/42 137/487 |
| 9,500,503 B2* | 11/2016 | Igarashi | .................. | G01F 5/005 |
| 2003/0061888 A1 | 4/2003 | Gould et al. | | |
| 2008/0294293 A1 | 11/2008 | Yamamoto | | |
| 2009/0283155 A1* | 11/2009 | Yoshino | .............. | F16K 31/1221 137/487.5 |
| 2010/0005876 A1 | 1/2010 | Lull et al. | | |
| 2010/0101664 A1* | 4/2010 | Yamamoto | .............. | F16K 7/045 137/486 |
| 2014/0230925 A1* | 8/2014 | Halimi | ................... | G05D 16/20 137/487.5 |
| 2015/0233746 A1* | 8/2015 | Igarashi | .................... | G01F 1/42 137/455 |

\* cited by examiner

FLOW RATE ADJUSTMENT APPARATUS

CROSS-REFERENCE TO RELATED APPLICATIONS

This application is based on Japanese Patent Application No. 2015-196749, the contents of which are incorporated herein by reference in its entirety.

TECHNICAL FIELD

The present disclosure relates to a flow rate adjustment apparatus that measures a flow rate of a fluid.

BACKGROUND ART

Conventionally, there has been known a flow rate control module that controls a flow rate of a fluid made to flow through a fluid circuit (for example, refer to Japanese Unexamined Patent Application, Publication No. 2010-242940).

The flow rate control module disclosed in Japanese Unexamined Patent Application, Publication No. 2010-242940 controls by a control valve a flow rate of a fluid that flows through a flow passage formed inside a housing body, and measures the flow rate of the fluid based on a pressure of the fluid detected by a pressure sensor.

SUMMARY

Technical Problem

However, since in the flow rate control module disclosed in Japanese Unexamined Patent Application, Publication No. 2010-242940, the housing body inside which the flow passage is formed is formed of an integrated member, a measurement error may occur in a sensor unit that measures the flow rate, by heat transferred from a portion (for example, a driver that makes a control valve operate) other than the sensor unit in an apparatus.

In addition, since the flow passage of the fluid formed inside the housing body is linearly formed from an inflow port to an outflow port, an installation area not less than a length of the flow passage is needed. Therefore, the installation area at the time of installing the flow rate control module on an installation surface becomes large.

The present disclosure has been made in view of such circumstances, and an object thereof is to provide a flow rate adjustment apparatus that suppresses heat transfer from a flow rate adjustment mechanism to a flow rate measurement mechanism, and in which an installation area at the time of installing the flow rate adjustment apparatus on an installation surface is reduced.

Solution to Problem

The present disclosure has employed the following solutions in order to solve the above-described problem.

A flow rate adjustment apparatus according to a first aspect of the present disclosure includes: a flow rate measurement mechanism that is attached to an installation surface; and a flow rate adjustment mechanism that is separably attached to the flow rate measurement mechanism. In the above-described flow rate adjustment apparatus, the flow rate measurement mechanism includes: a flow rate measurement unit that measures a flow rate of a fluid that flows through a first flow passage; and a first casing unit that houses the flow rate measurement unit thereinside and can be attached to the installation surface, and the flow rate adjustment mechanism includes: a drive unit that moves a valve body part along an axis line intersecting with the installation surface; a control unit that controls the movement of the valve body part by the drive unit; a valve main body in which a valve chamber that houses the valve body part, a second flow passage that communicates with a valve hole into which the valve body part is inserted, and a third flow passage that is connected to an external flow passage have been formed; and a second casing unit that houses the drive unit and the control unit thereinside and is attached to the valve main body. Further, in the above-described flow rate adjustment apparatus, the flow rate adjustment mechanism is attached to the flow rate measurement mechanism in a state where a clearance communicating with an outside is provided between the first casing unit and the valve main body, and the flow rate measurement unit has a coupling part that couples the second flow passage extending along the axis line to the first flow passage.

According to the flow rate adjustment apparatus according to the first aspect of the present disclosure, the clearance provided between the first casing unit of the flow rate measurement mechanism and the valve main body of the flow rate adjustment mechanism communicates with the outside. Therefore, heat generated when the drive unit of the flow rate adjustment mechanism moves the valve body part is suppressed from being transferred from the valve main body to the first casing unit. Hereby, a measurement error is suppressed from occurring in the flow rate measurement unit by the heat transfer from the flow rate adjustment mechanism to the flow rate measurement mechanism.

In addition, according to the flow rate adjustment apparatus according to the first aspect of the present disclosure, it has a structure in which the second flow passage formed in the valve main body and the first flow passage formed in the flow rate measurement unit are coupled to each other by the coupling part. Since the second flow passage is formed along the axis line intersecting with the installation surface on which the flow rate measurement mechanism is installed, the flow passage from the inflow port to the outflow port does not have a linear shape, but has a serpentine shape. Therefore, a distance from the inflow port to the outflow port of the flow rate adjustment apparatus installed on the installation surface becomes shorter than a flow passage length. Hereby, an installation area (a footprint) at the time of installing the flow rate adjustment apparatus on the installation surface can be reduced.

As described above, according to the flow rate adjustment apparatus according to the first aspect of the present disclosure, heat transfer from the flow rate adjustment mechanism to the flow rate measurement mechanism can be suppressed, and the installation area at the time of installing the flow rate adjustment apparatus on the installation surface can be reduced.

In the flow rate adjustment apparatus according to the first aspect of the present disclosure, the second flow passage may be formed inside the valve main body, a projection part projecting toward the installation surface is also formed thereat, an insertion hole into which the projection part is inserted is formed in the first casing unit, and the coupling part may be configured to couple to the first flow passage the second flow passage formed in the projection part inserted into the insertion hole.

By configuring the flow rate adjustment apparatus as described above, the second flow passage and the first flow passage can be coupled to each other by inserting the projection part formed at the valve main body into the insertion hole of the first casing unit.

In the flow rate adjustment apparatus according to the above-described configuration, a recess into which a tip of the projection part may be inserted is formed in the coupling part, and an annular first seal member that comes into contact with an inner peripheral surface of the recess and an annular second seal member that comes into contact with an inner peripheral surface of the insertion hole may be attached to an outer peripheral surface of the projection part.

By configuring the flow rate adjustment apparatus as described above, outflow of the fluid can be doubly suppressed by the first seal member arranged between the inner peripheral surface of the recess and the outer peripheral surface of the projection part, and the second seal member arranged between the inner peripheral surface of the insertion hole and the outer peripheral surface of the projection part.

In the flow rate adjustment apparatus according to the first aspect of the present disclosure, the flow rate measurement unit may measure the flow rate of the fluid by measuring on a downstream side of the first flow passage a temperature of the fluid heated on an upstream side thereof.

By configuring the flow rate adjustment apparatus as described above, even in a case where the flow rate measurement unit is used that performs thermal flow rate measurement in which the temperature of the fluid heated on the upstream side of the first flow passage is measured on the downstream side thereof to thereby measure the flow rate, heat transfer from the flow rate adjustment mechanism to the flow rate measurement mechanism can be suppressed to thereby suppress the measurement error.

In the flow rate adjustment apparatus according to the first aspect of the present disclosure, the control unit may be formed in a plate shape, and is a control board arranged in parallel to the axis line, and a region in the installation surface on which the flow rate measurement unit is arranged, and a region in the installation surface on which the control board is arranged may overlap with each other.

By configuring the flow rate adjustment apparatus as described above, the control board is arranged in parallel to the axis line along which the valve body part moves, and is arranged in a region in the installation surface that overlaps with the flow rate measurement unit, and the installation area can be suppressed from being expanded even if the control board is housed inside.

Advantageous Effects

According to the present disclosure, there can be provided the flow rate adjustment apparatus that suppresses heat transfer from the flow rate adjustment mechanism to the flow rate measurement mechanism, and in which the installation area at the time of installing the flow rate adjustment apparatus on the installation surface is reduced.

DESCRIPTION OF EMBODIMENTS

Hereinafter, a flow rate adjustment apparatus 100 of one embodiment of the present disclosure will be explained with reference to drawings.

Figure 1:
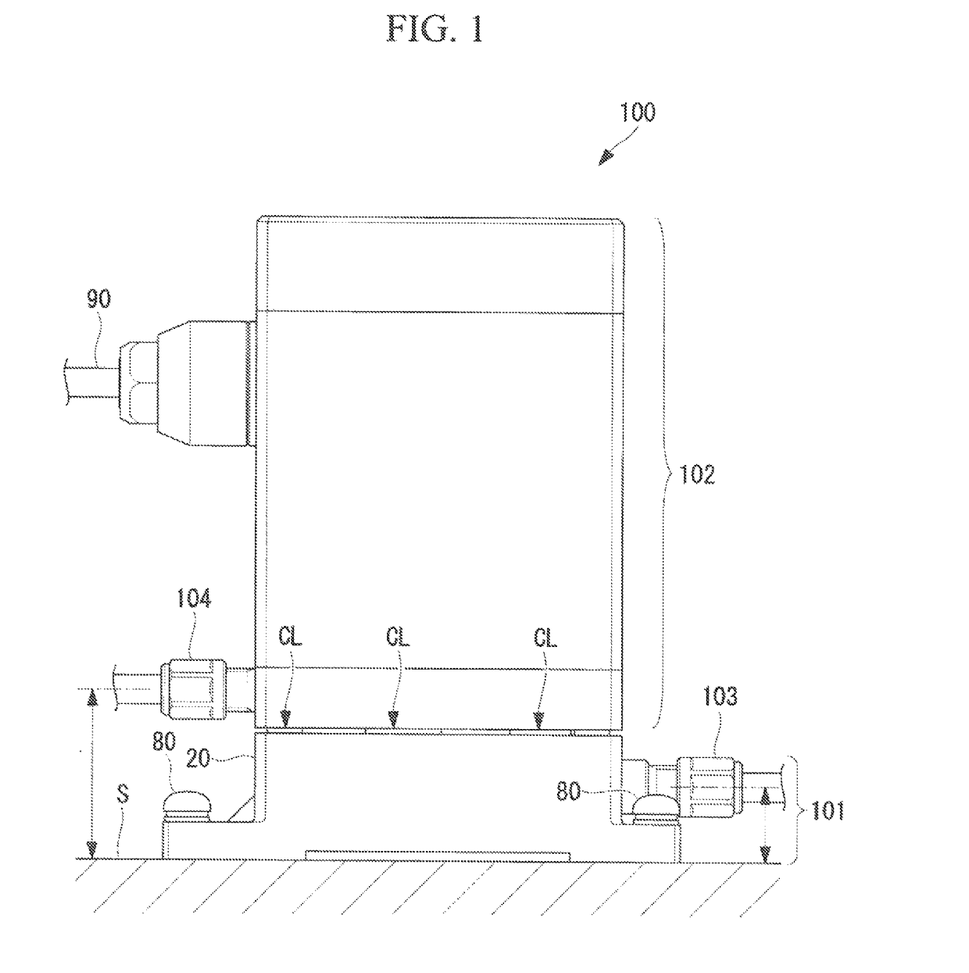
FIG. 1 is an elevational view showing one embodiment of a flow rate adjustment apparatus.

The flow rate adjustment apparatus 100 of the embodiment shown in FIG. 1 is the apparatus that adjusts a flow rate of a fluid (for example, liquids, such as pure water, and a chemical liquid used for semiconductor manufacturing apparatuses) flowing in from an inflow port 103 and flowing out from an outflow port 104.

As shown in an elevational view of FIG. 1, the flow rate adjustment apparatus 100 of the embodiment includes: a flow rate measurement mechanism 101 that is attached to an installation surface S; and a flow rate adjustment mechanism 102 that is separably attached to the flow rate measurement mechanism 101.

Next, the flow rate measurement mechanism 101 will be explained.

Figure 2:
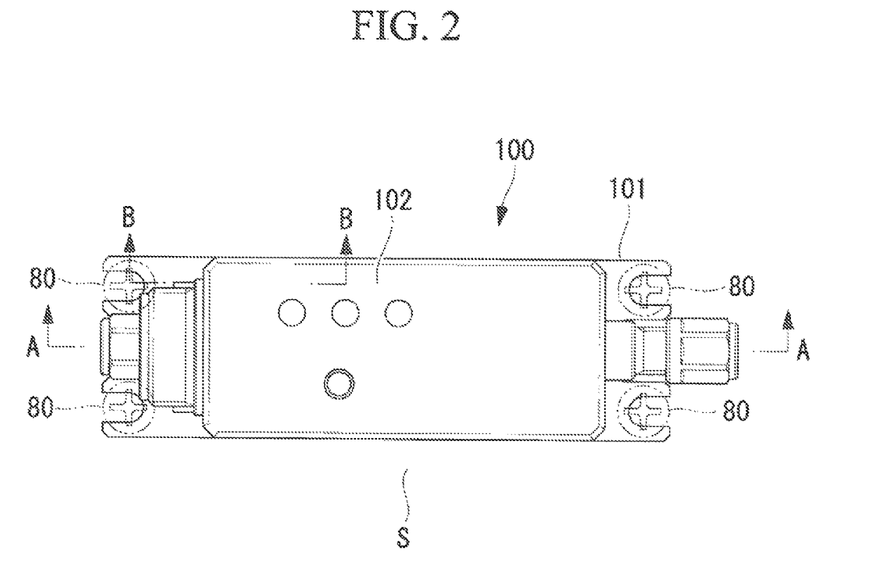
FIG. 2 is a plan view of the flow rate adjustment apparatus shown in FIG. 1.

As shown in a plan view of FIG. 2, the flow rate measurement mechanism 101 is attached to the installation surface S by fastening four fastening bolts 80 to fastening holes (illustration is omitted) provided in the installation surface S.

Figure 3:
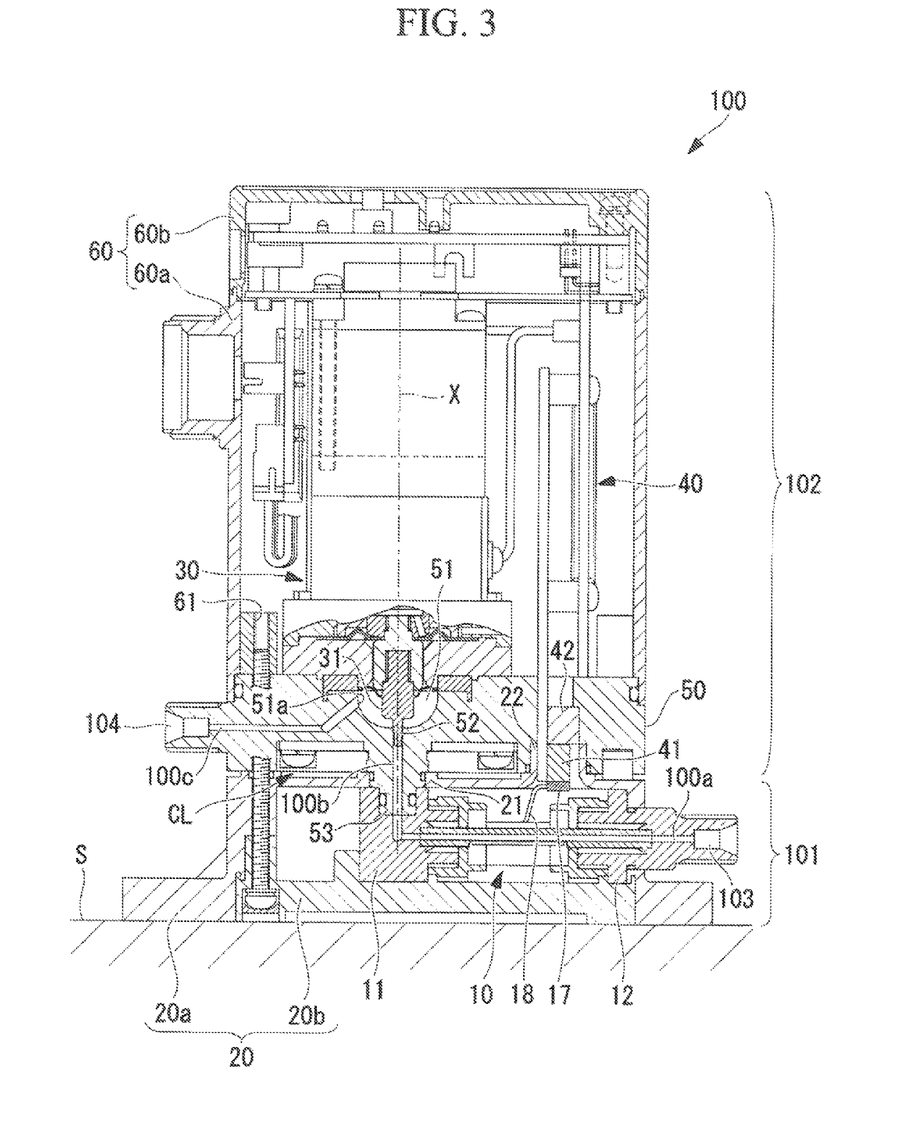
FIG. 3 is a partial longitudinal cross-sectional view taken along a line A-A of the flow rate adjustment apparatus shown in FIG. 2.
Figure 4:
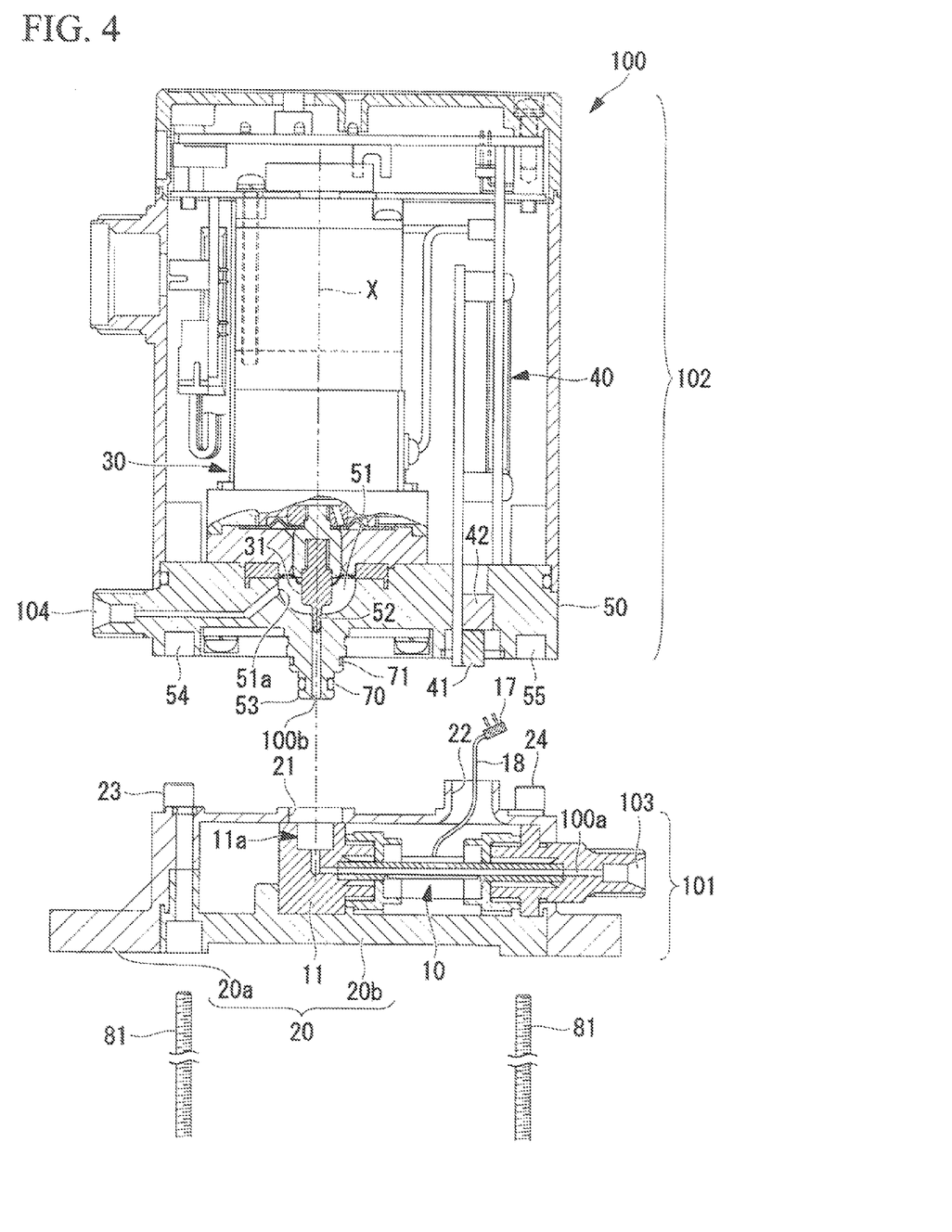
FIG. 4 is a partial longitudinal cross-sectional view showing a state where a flow rate measurement mechanism and a flow rate adjustment mechanism are separated from each other.

FIGS. 3 and 4 are partial longitudinal cross-sectional views taken along a line A-A of the flow rate adjustment apparatus 100 shown in FIG. 2. FIG. 3 shows a state where the flow rate adjustment mechanism 102 is attached to the flow rate measurement mechanism 101, and FIG. 4 shows a state where the flow rate measurement mechanism 101 and the flow rate adjustment mechanism 102 are separated from each other.

As shown in FIGS. 3 and 4, the flow rate measurement mechanism 101 has: a thermal flowmeter (a flow rate measurement unit) 10 that measures a flow rate of a fluid flowing through a first flow passage 100a; and a lower casing (a first casing unit) 20 that houses the thermal flowmeter 10 thereinside. The lower casing 20 has: a main body 20a that can be attached to the installation surface S and houses the thermal flowmeter 10 thereinside; and a bottom 20b that is arranged under the main body 20a, and in which the thermal flowmeter 10 is attached to an upper surface of the bottom 20b.

A fastening bolt 81 is inserted into an insertion hole formed in each of the main body 20a and the bottom 20b to then be fastened to a fastening hole 61 formed in an upper casing 60 of the flow rate adjustment mechanism 102, and thereby the lower casing 20 is attached to the flow rate adjustment mechanism 102.

Although FIG. 3 shows a partial cross section taken along the line A-A of the flow rate adjustment apparatus 100 shown in FIG. 2, the fastening hole 61 shown in FIG. 3 shows a cross section taken along a line B-B of the flow rate adjustment apparatus 100 shown in FIG. 2. In addition, although only one fastening hole 61 is shown in FIG. 3, the four fastening holes 61 shall be provided in four corners of the flow rate adjustment mechanism 102 shown in the plan view of FIG. 2.

Figure 5:
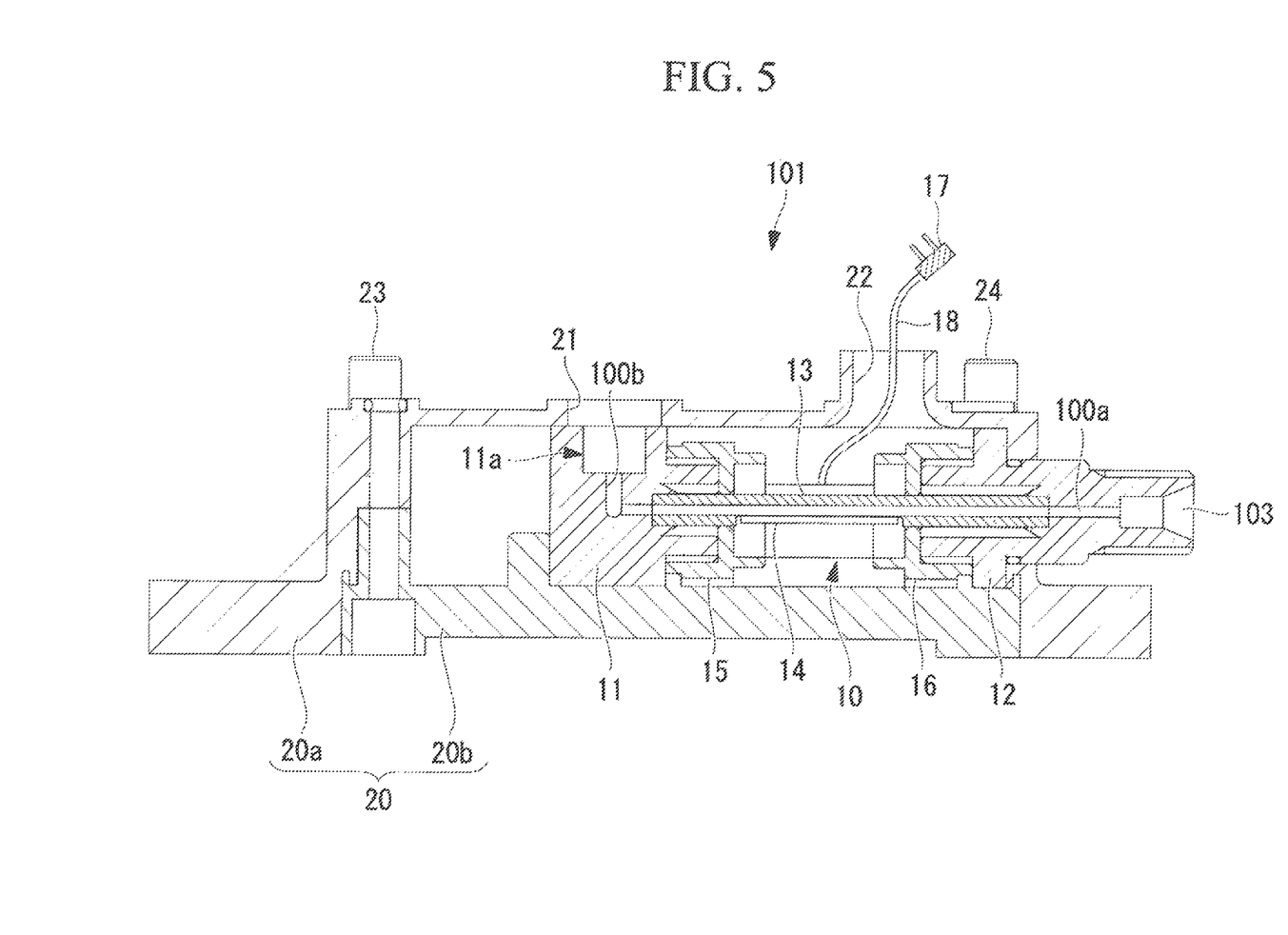
FIG. 5 is a longitudinal cross-sectional view of the flow rate measurement mechanism shown in FIG. 4.

As shown in FIG. 5, the thermal flowmeter 10 includes: a coupling part 11 arranged between the main body 20a and the bottom 20b; a connection part 12 arranged between the main body 20a and the bottom 20b; a measurement pipe 13 inserted into the coupling part 11 and the connection part 12; a sensor board 14 applied to the measurement pipe 13; a nut 15 that fixes one end of the measurement pipe 13 to the coupling part 11; and a nut 16 that fixes the other end of the measurement pipe 13 to the connection part 12.

The thermal flowmeter 10 passes a current through a heating resistance line (illustration is omitted) formed at the sensor board 14 to thereby heat a fluid that flows through an upstream side of the measurement pipe 13, detects a temperature of the fluid heated by a temperature-detecting resistance line (illustration is omitted) formed at the sensor board 14, and thereby measures the flow rate of the fluid.

As shown in FIG. 5, the coupling part 11 is a member that couples a second flow passage 100b extending along an axis line X to a first flow passage 100a. A recess 11a is formed in a surface of the coupling part 11 that comes into contact with an inner peripheral surface of the main body 20a of the lower casing 20. An insertion hole 21 is formed in a position opposed to the recess 11a of the main body 20a. A tip of a projection part 53 formed at a valve main body 50 is inserted into the insertion hole 21 and the recess 11a when the flow rate adjustment mechanism 102 is attached to the flow rate measurement mechanism 101.

As shown in FIG. 5, a through hole 22 is formed in the main body 20a that houses the thermal flowmeter 10 thereinside. The through hole 22 is formed in a cylindrical shape so as to project closer to a flow rate adjustment mechanism 102 side than the other portions of the main body 20a. A reason why the through hole 22 is formed in the cylindrical shape is that when the flow rate measurement mechanism 101 is attached to the flow rate adjustment mechanism 102, an upper end of the through hole 22 is set to be a state of being in contact with the valve main body 50, and an inside of the through hole 22 is kept from communicating with outer space. The through hole 22 is provided to pass a cable 18 therethrough that connects a signal line (illustration is omitted) of the thermal flowmeter 10 to a signal line of the control board 40.

A connector 17 is attached to a tip of the cable 18, and the signal line of the thermal flowmeter 10 and the signal line of the control board 40 are electrically connected to each other by connecting the connector 17 to a connector 41 of the control board 40.

As shown in FIG. 4, since the connector 17 can be pulled out to an upper side of the through hole 22, the connector 17 of the flow rate measurement mechanism 101 can be easily connected to the connector 41 of the flow rate adjustment mechanism 102 before the flow rate adjustment mechanism 102 is attached to the flow rate measurement mechanism 101.

In addition, as shown in FIG. 4, the control board 40 of the flow rate adjustment mechanism 102 is arranged so that a lower end may penetrate the valve main body 50, and the connector 41 is attached to the lower end. As shown in FIG. 3, the lower end of the control board 40 becomes a state of being inserted into the through hole 22, in a state where the flow rate adjustment mechanism 102 is attached to the flow rate measurement mechanism 101. Therefore, a length of the cable 18 for connecting the connector 17 of the flow rate measurement mechanism 101 and the connector 41 of the flow rate adjustment mechanism 102 is reduced, and generation of noise can be suppressed.

In addition, in an upper side of the connector 41 shown in FIG. 4, there is arranged a filling material 42 that thermally insulates an upper space in which the control board 40 has been arranged from a lower space in which the connector 41 has been arranged. A trouble in which heat of the fluid, etc. are transferred from the flow rate measurement mechanism 101 to the flow rate adjustment mechanism 102 through the through hole 22 can be suppressed by arranging the filling material 42. For example, urethane can be used as a material of the filling material 42.

As shown in FIG. 5, a pair of projection parts 23 and 24 that extends in a cylindrical shape is formed at a surface of a side opposed to the flow rate adjustment mechanism 102 of the lower casing 20. The pair of projection parts 23 and 24 can be inserted into a pair of positioning holes 54 and 55 formed in the valve main body 50 of the flow rate adjustment mechanism 102. When the flow rate adjustment mechanism 102 is attached to the flow rate measurement mechanism 101, the pair of projection parts 23 and 24 is inserted in the pair of positioning holes 54 and 55, and thereby the flow rate adjustment mechanism 102 is positioned to the flow rate measurement mechanism 101.

Next, the flow rate adjustment mechanism 102 will be explained.

As shown in FIG. 3, the flow rate adjustment mechanism 102 has: an electric drive mechanism (a drive unit) 30 that moves a valve body part 31 along the axis line X intersecting with the installation surface S; the control board (a control unit) 40 that controls the movement of the valve body part 31 by the electric drive mechanism 30; the valve main body 50; and the upper casing (a second casing unit) 60 that houses the electric drive mechanism 30 and the control board 40 thereinside.

The electric drive mechanism 30 is, for example, a mechanism that converts power in a direction along the axis line X to thereby move the valve body part 31 while rotating a drive shaft around the axis line X by a stepping motor and reducing a velocity of the rotation of the drive shaft by a reducer.

The control board 40 receives electric power supply from an external control device (illustration is omitted) through the cable 90 (refer to FIG. 1), and receives various control signals. In addition, the control board 40 receives the flow rate of the fluid measured by the thermal flowmeter 10, and controls the movement of the valve body part 31 by the electric drive mechanism 30 so that the received flow rate coincides with a target flow rate (for example, a target flow rate included in the control signal received from the external control device).

The control board 40 formed in a plate shape as shown in FIG. 3 is arranged in parallel to the axis line X. In addition, a region in the installation surface S where the thermal flowmeter 10 is arranged, and a region in the installation surface S where the control board 40 is arranged overlap with each other. Therefore, as compared with a case where these regions are not overlapped with each other, an installation area of the flow rate adjustment apparatus 100 in the installation surface S can be reduced.

The valve main body 50 is a member in which there are formed: a valve chamber 51 that houses the valve body part 31; the second flow passage 100b that communicates with a valve hole 52 into which a tip of the valve body part 31 is inserted; and a third flow passage 100c that is connected to an external flow passage coupled to the outflow port 104. The valve main body 50 is the single member formed of a fluorine resin material.

The second flow passage 100b of the valve main body 50 communicates with the first flow passage 100a of the flow rate measurement mechanism 101, and the fluid guided from the inflow port 103 to the first flow passage 100a flows in from a lower end side. The fluid that has flowed into the lower end side of the second flow passage 100b is guided from a lower side to an upper side to then flow into the valve chamber 51 through the valve hole 52. The fluid that has flowed in from a lower end of the valve chamber 51 formed in a mortar shape flows into the third flow passage 100c from an outflow hole 51a formed near an upper end of the valve chamber 51, and is discharged from the outflow port 104.

As described above, in the flow rate adjustment apparatus 100 of the embodiment, since the fluid that has flowed in from the lower end of the valve chamber 51 flows out to an outside of the valve chamber 51 through the outflow hole 51a formed near the upper end of the valve chamber 51, the unreplaced fluid is suppressed from staying near the upper end of the valve chamber 51, and replaceability of the fluid is good.

As shown in FIG. 4, the second flow passage 100b is formed inside the valve main body 50, and the projection part 53 projecting toward the installation surface S is formed thereat. An annular O-ring 70 (a first seal member) that comes into contact with an inner peripheral surface of the recess 11a of the coupling part 11 and an O-ring 71 (a second seal member) that comes into contact with an inner peripheral surface of the insertion hole 21 of the lower casing 20 are attached to an outer peripheral surface of the projection part 53.

The upper casing 60 has: a main body 60a attached to the valve main body 50; and a lid 60b that is attached to the main body 60a to thereby form a closed space in which the electric drive mechanism 30 and the control board 40 are housed. The main body 60a is attached to the valve main body 50, further the lid 60b is attached to the main body 60a, and thereby the upper casing 60 and the valve main body 50 are integrated as the flow rate adjustment mechanism 102 inside which the electric drive mechanism 30 and the control board 40 are housed.

Next, there will be explained a clearance CL formed between the flow rate measurement mechanism 101 and the flow rate adjustment mechanism 102 when the flow rate adjustment mechanism 102 is attached to the flow rate measurement mechanism 101.

As shown in FIG. 4, the flow rate measurement mechanism 101 and the flow rate adjustment mechanism 102 can be separated from each other. In a separated state shown in FIG. 4, the first flow passage 100a of the flow rate measurement mechanism 101 and the second flow passage 100b of the flow rate adjustment mechanism 102 are not coupled to each other.

The plurality of fastening bolts 81 are inserted from a bottom 20b side of the lower casing 20, and are fastened to the fastening holes 61 formed in the upper casing 60, and thereby the flow rate measurement mechanism 101 and the flow rate adjustment mechanism 102 become a state of being integrally coupled to each other. When the flow rate measurement mechanism 101 and the flow rate adjustment mechanism 102 are coupled to each other, the projection part 53 formed at the valve main body 50 is inserted into the insertion hole 21 and the recess 11a of the flow rate measurement mechanism 101, and the pair of projection parts 23 and 24 formed at the lower casing 20 is positioned in the pair of positioning holes 54 and 55 of the valve main body 50.

As shown in FIGS. 1 and 3, the flow rate adjustment mechanism 102 is attached to the flow rate measurement mechanism 101 in a state where the clearance CL communicating with the outside is provided between the lower casing 20 and the valve main body 50. The clearance CL is a space provided to suppress heat transfer from the flow rate adjustment mechanism 102 to the flow rate measurement mechanism 101.

The clearance CL communicating with the outside is provided between the flow rate adjustment mechanism 102 and the flow rate measurement mechanism 101, and thereby a contact area of the flow rate adjustment mechanism 102 and the flow rate measurement mechanism 101 becomes small. In addition, air is guided from outside to the clearance CL and flows therethrough, and thereby heat of the flow rate adjustment mechanism 102 can be transferred to the air to be then emitted to the outside. As a result of these, a heat transfer amount from the flow rate adjustment mechanism 102 to the flow rate measurement mechanism 101 can be reduced. Therefore, heat is transferred to the thermal flowmeter 10 of the flow rate measurement mechanism 101, and a measurement error of the flow rate of the fluid is suppressed from occurring.

Figure 6:
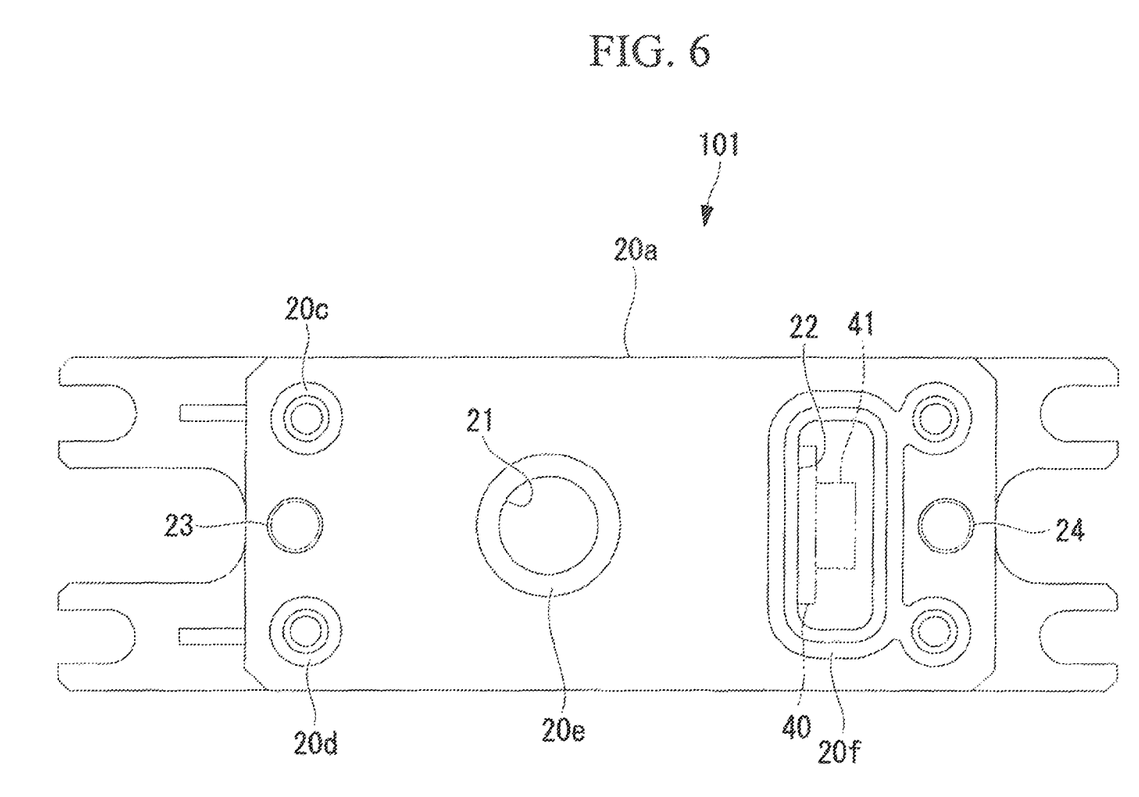
FIG. 6 is a plan view of the flow rate measurement mechanism shown in FIG. 5.

In an upper surface of the main body 20a of the lower casing 20 shown in FIG. 6, portions that come into contact with the lower surface of the valve main body 50 are upper surfaces of the projection parts 23 and 24, and contact parts 20c, 20d, 20e, and 20f. The other portion of the upper surface of the main body 20a is the portion in which the clearance CL is formed without coming into contact with the lower surface of the valve main body 50.

As shown in FIG. 6, since most of the upper surface of the main body 20a serves as the portion in which the clearance CL is formed, and only a part of the upper surface of the main body 20a is in contact with the lower surface of the valve main body 50, the heat transfer amount from the flow rate adjustment mechanism 102 to the flow rate measurement mechanism 101 can be reduced.

Note that as shown in FIG. 6, the lower end of the control board 40 and the connector 41 become a state of being inserted into the through hole 22, in the state where the flow rate adjustment mechanism 102 is attached to the flow rate measurement mechanism 101.

There will be explained actions and effects exerted by the flow rate adjustment apparatus 100 of the embodiment explained above.

According to the flow rate adjustment apparatus 100 of the embodiment, the clearance CL provided between the lower casing 20 of the flow rate measurement mechanism 101 and the valve main body 50 of the flow rate adjustment mechanism 102 communicates with the outside. Therefore, heat generated when the electric drive mechanism 30 of the flow rate adjustment mechanism 102 moves the valve body part 31 is suppressed from being transferred from the valve main body 50 to the lower casing 20. Hereby, the measurement error is suppressed from occurring in the thermal flowmeter 10 by the heat transfer from the flow rate adjustment mechanism 102 to the flow rate measurement mechanism 101.

In addition, according to the flow rate adjustment apparatus 100 of the embodiment has a structure in which the second flow passage 100b formed in the valve main body 50 and the first flow passage 100a formed in the thermal flowmeter 10 are coupled to each other by the coupling part 11. Since the second flow passage 100b is formed along the axis line X intersecting with the installation surface S on which the flow rate measurement mechanism 101 is installed, the flow passage from the inflow port 103 to the outflow port 104 does not have a linear shape, but has a serpentine shape. Therefore, a distance from the inflow port 103 to the outflow port 104 of the flow rate adjustment apparatus 100 installed on the installation surface S becomes shorter than a flow passage length. Hereby, the installation area (a footprint) at the time of installing the flow rate adjustment apparatus 100 on the installation surface S can be reduced.

As described above, according to the flow rate adjustment apparatus 100 of the embodiment, heat transfer from the flow rate adjustment mechanism 102 to the flow rate measurement mechanism 101 can be suppressed, and the installation area at the time of installing the flow rate adjustment apparatus 100 on the installation surface S can be reduced.

In the flow rate adjustment apparatus 100 of the embodiment, the second flow passage 100b is formed inside the valve main body 50, the projection part 53 projecting toward the installation surface S is also formed thereat, the insertion hole 21 into which the projection part 53 is inserted is formed in the lower casing 20, and the coupling part 11 couples to the first flow passage 100a the second flow passage 100b formed in the projection part 53 inserted into the insertion hole 21.

By configuring the flow rate adjustment apparatus 100 as described above, the second flow passage 100b and the first flow passage 100a can be coupled to each other by inserting the projection part 53 formed at the valve main body 50 into the insertion hole 21 of the lower casing 20.

In the flow rate adjustment apparatus 100 of the embodiment, the recess 11a into which the tip of the projection part 53 is inserted is formed in the coupling part 11, and the O-ring 70 that comes into contact with the inner peripheral surface of the recess 11a and the O-ring 71 that comes into contact with the inner peripheral surface of the insertion hole 21 are attached to the outer peripheral surface of the projection part 53.

By configuring the flow rate adjustment apparatus 100 as described above, outflow of the fluid can be doubly suppressed by the O-ring 70 arranged between the inner peripheral surface of the recess 11a and the outer peripheral surface of the projection part 53, and the O-ring 71 arranged between the inner peripheral surface of the insertion hole 21 and the outer peripheral surface of the projection part 53.

In the flow rate adjustment apparatus 100 of the embodiment, the thermal flowmeter 10 measures the flow rate of the fluid by measuring on a downstream side of the first flow passage 100a a temperature of the fluid heated on an upstream side thereof.

By configuring the flow rate adjustment apparatus 100 as described above, even in a case where the thermal flowmeter 10 is used that performs thermal flow rate measurement in which the temperature of the fluid heated on the upstream side of the first flow passage 100a is measured on the downstream side thereof to thereby measure the flow rate, heat transfer from the flow rate adjustment mechanism 102 to the flow rate measurement mechanism 101 can be suppressed to thereby suppress the measurement error.

In the flow rate adjustment apparatus 100 of the embodiment, the control board 40 is formed in the plate shape, and is arranged in parallel to the axis line X, and the region in the installation surface S where the thermal flowmeter 10 is arranged, and the region in the installation surface S where the control board 40 is arranged overlap with each other.

By configuring the flow rate adjustment apparatus 100 as described above, the control board 40 is arranged in parallel to the axis line X along which the valve body part 31 moves, and is arranged in a region in the installation surface S that overlaps with the thermal flowmeter 10, and the installation area can be suppressed from being expanded even if the control board 40 is housed inside.

The invention claimed is:

1. A flow rate adjustment apparatus comprising:
    a flow rate measurement mechanism that is attached to an installation surface; and
    a flow rate adjustment mechanism that is separably attached to the flow rate measurement mechanism, wherein
    the flow rate measurement mechanism includes:
        a flow rate measurement unit that measures a flow rate of a fluid that flows through a first flow passage; and
        a first casing unit that houses the flow rate measurement unit thereinside and is attached to the installation surface,
    the flow rate adjustment mechanism includes:
        a drive unit that moves a valve body part along an axis line intersecting with the installation surface;
        a control unit that controls the movement of the valve body part by the drive unit;
        a valve main body in which a valve chamber that houses the valve body part, a second flow passage that communicates with a valve hole into which the valve body part is inserted, and a third flow passage that is connected to an external flow passage have been formed; and
        a second casing unit that houses the drive unit and the control unit thereinside and is attached to the valve main body, wherein
    the flow rate adjustment mechanism is attached to the flow rate measurement mechanism in a state where a clearance communicating with an outside is provided between the first casing unit and the valve main body, and
    the flow rate measurement unit has a coupling part that couples the second flow passage extending along the axis line to the first flow passage.

2. The flow rate adjustment apparatus according to claim 1, wherein
    the second flow passage is formed inside the valve main body, and a projection part projecting toward the installation surface is formed thereat,
    an insertion hole into which the projection part is inserted is formed in the first casing unit, and
    the coupling part couples to the first flow passage the second flow passage formed in the projection part inserted into the insertion hole.

3. The flow rate adjustment apparatus according to claim 2, wherein
    a recess into which a tip of the projection part is inserted is formed in the coupling part, and
    an annular first seal member that comes into contact with an inner peripheral surface of the recess and an annular second seal member that comes into contact with an inner peripheral surface of the insertion hole are attached to an outer peripheral surface of the projection part.

4. The flow rate adjustment apparatus according to claim 1, wherein the flow rate measurement unit measures the flow rate of the fluid by measuring on a downstream side of the first flow passage a temperature of the fluid heated on an upstream side thereof.

5. The flow rate adjustment apparatus according to claim 1, wherein the control unit is formed in a plate shape, and is a control board arranged in parallel to the axis line, and a region in the installation surface on which the flow rate measurement unit is arranged, and a region in the installation surface on which the control board is arranged overlap with each other.

\* \* \* \* \*